(12) United States Patent
Matsuda et al.

(10) Patent No.: US 7,039,688 B2
(45) Date of Patent: May 2, 2006

(54) METHOD AND APPARATUS FOR AUTOMATIC NETWORK CONFIGURATION

(75) Inventors: Toru Matsuda, Machida (JP); Kurt Piersol, Santa Cruz, CA (US); Shinsuke Teramura, Yokohama (JP); Akio Urabe, Tokyo (JP); Tatsuya Inagaki, Ito (JP)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 09/191,277

(22) Filed: Nov. 12, 1998

(65) Prior Publication Data

US 2002/0133573 A1 Sep. 19, 2002

(51) Int. Cl.
*G06F 15/177* (2006.01)

(52) U.S. Cl. ............ 709/220; 709/203; 709/208; 709/245

(58) Field of Classification Search ........ 709/220–222, 709/217–219, 203, 223–225, 208, 245
See application file for complete search history.

(56) References Cited

U.S. PATENT DOCUMENTS

| | | | |
|---|---|---|---|
| 5,222,234 A | 6/1993 | Wang et al. | |
| 5,572,583 A | 11/1996 | Wheeler, Jr. et al. | |
| 5,596,723 A * | 1/1997 | Romohr | 709/222 |
| 5,687,315 A | 11/1997 | Tezuka et al. | |
| 5,708,810 A | 1/1998 | Kern et al. | |
| 5,742,816 A | 4/1998 | Barr et al. | |
| 5,749,083 A | 5/1998 | Koda et al. | |
| 5,793,498 A | 8/1998 | Scholl et al. | |
| 5,796,736 A * | 8/1998 | Suzuki | 370/399 |
| 5,828,830 A * | 10/1998 | Rangaraian et al. | 713/201 |
| 5,845,304 A | 12/1998 | Iijima | |
| 5,848,410 A | 12/1998 | Walls et al. | |
| 5,852,722 A * | 12/1998 | Hamilton | 709/221 |
| 5,861,959 A | 1/1999 | Barak | |
| 5,880,855 A | 3/1999 | Ishikawa | |
| 5,905,980 A | 5/1999 | Masuichi et al. | |
| 5,907,837 A | 5/1999 | Ferrel et al. | |
| 5,923,845 A | 7/1999 | Kamiya et al. | |
| 5,946,701 A | 8/1999 | Hamada | |
| 5,980,078 A * | 11/1999 | Krivoshein et al. | 709/221 |
| 6,012,088 A * | 1/2000 | Li et al. | 709/220 |
| 6,021,429 A * | 2/2000 | Danknick | 709/208 |
| 6,029,196 A * | 2/2000 | Lenz | 709/221 |
| 6,052,784 A * | 4/2000 | Day | 713/201 |
| 6,075,776 A * | 6/2000 | Tanimoto et al. | 370/254 |
| 6,167,446 A * | 12/2000 | Lister et al. | 709/223 |

(Continued)

FOREIGN PATENT DOCUMENTS

EP 0 627 686 A1 12/1994

(Continued)

OTHER PUBLICATIONS ftp://ftp.isi.edu/in-notes/rfc1034.txt, P. Mockapetris, "Domain Names-Concepts And Facilities", Web Site-Network Working Group, Obsoletes: RFCs 882, 883, 973, Pertinent pp. 1-42.

(Continued)

*Primary Examiner*—Philip B. Tran
(74) *Attorney, Agent, or Firm*—Blakely, Sokoloff, Taylor & Zafman LLP

(57) ABSTRACT

A dynamically configurable network architecture comprising networked office appliances which provide network addressing, network naming, service discovery, and user identification in one system. The network architecture provides automatic configuration services for unadministered networks while being automatically adaptable within administered environments.

48 Claims, 10 Drawing Sheets

U.S. PATENT DOCUMENTS

| | | | |
|---|---|---|---|
| 6,219,715 B1 * | 4/2001 | Ohno et al. .................. | 709/220 |
| 6,314,459 B1 * | 11/2001 | Freeman ..................... | 709/220 |
| 6,446,108 B1 * | 9/2002 | Rosenberg et al. ......... | 709/203 |
| 6,618,806 B1 * | 9/2003 | Brown et al. ............... | 709/225 |

FOREIGN PATENT DOCUMENTS

| | | |
|---|---|---|
| EP | 0 843 440 A2 | 5/1998 |
| EP | 0843440 A2 | 5/1998 |

OTHER PUBLICATIONS ftp://ftp.isi.edu/in-notes/rfc1035.txt, P. Mockapetris, "Domain Names-Implementation And Specification", Web Site-Network Working Group, Obsoletes: RFCs 882, 883, 973, Pertinent pp. 1-42.

RFC 2131, "Dynamic Host Configuration Protocol", Mar. 1997, Pertinent pp. 7-45.

D. Eastlake 3rd CyberCash, Inc. Web Site-Network Working Group RFC 2137, Updates:1035, Category: Standards Track, "Secure Domain Name System Dynamic Update", Apr. 1997, Pertinent pp. 1-11.

P. Vixie, Edtor ISC, S. Thompson Bellcore, Y.Rekhter Cisco J. Bound DEC, Web Site-Network Working Group RFC 2136, Updates: 1035, Category: Standards Track,"Dynamic Updates in the Domain Name System (DNS Update)", Pertinent pp. 1-26.

RFC 2131, "Dynamic Host Configuration Protocol", Mar. 1997, Pertinent pp. 1-45.

J. Veizades@ Home Network E. Guttman, C. Perkins, Sun Microsystems S. Kaplan, Web Site-Network Working Group, RFC:2165, Category: Standards Track, "Service Location Protocol", Jun. 1997, Pertinent pp. 1-72.

J. Reynolds, J. Postel, Web Site-Network Working Group, RFC 1700, STD:2, Obsoletes RFCs: 1340, 1060,1010,990, 960,943,923,900,870,820,790,776,770,762,758,755,750, 739,604,503,433,349, Obsoletes IENs: 127,117,93, Category: Standards Track, "Assigned Numbers", Oct. 1994, Pertinent pp. 1-230.

Search Report, European Patent Office, Application No. EP 99 11 7483, Jan. 22, 2002, pp. 1-6.

R. DROMS, "Dynamic Host Configuration Protocol," Request for Comments: 2131, Mar. 1997, XP002168114, http://www.faqs.org/rfcs/rfc2131.html.

J. Veizades, et al., "Service Location Protocol," Request for Comments: 2165, Jun. 1997, pp. 1-50, XP002185924, http://www.faqs.org/rfcs/rfc2165.html.

Hiltunen, et al., "Access Control in Wide-Area Networks," Distributed Computing Systems, 1997, Proceedings of the 17th International Conference on Baltimore, MD, USA, May 27-30, 1997, pp. 330-337, XP010229367. ISBN: 0-8186-7813-5.

* cited by examiner

METHOD AND APPARATUS FOR AUTOMATIC NETWORK CONFIGURATION

BACKGROUND OF THE INVENTION

1. Field of the Invention

The present invention relates generally to a method and apparatus for automatically configuring a network. More particularly, the present invention relates to a dynamically configurable network architecture containing networked office appliances (NOAs).

2. Background

Generally, before a device can operate in a networked environment, the device needs to be appropriately configured. The specific network configuration required for each device may vary depending upon factors such as network topology and device functionality. On a Transmission Control Protocol/Internet Protocol (TCP/IP) network, each device or host is assigned a unique identifier known as an IP address. IP addresses usually take the form of a 32-bit numeric address written as four numbers separated by periods, but may differ depending upon the particular network topology. More information regarding IP address formatting can be found in Request For Comments (RFC) 1700, "Assigned Numbers", October 1994.

Prior to establishing communication with a host across a TCP/IP network, the individual initiating the communication determines the IP address of the destination host much like telephone numbers are used when placing telephone calls. Individuals do not always know a recipient's IP address, and unfortunately there is no simple way of ascertaining it. Fortunately, however, mechanisms such as domain names have been developed which allow for simplified network communication.

Domain names were introduced as a less complicated means for users to communicate with remote hosts. Background information and specifications regarding domain names can be found in RFC 1034, "Domain Names—Concepts and Facilities", November 1987, and a companion RFC 1035, "Domain Names—Implementation and Specification", November 1987. In its simplest form, a domain name is nothing more than a human-readable text representation of one or more unique numeric IP addresses. By using domain names, users are not required to memorize numerous awkward IP addresses in order to communicate with hosts, rather they need only remember the appropriate host's domain name. Furthermore, most domain names reflect some variation of their corresponding hosts' names, and thus act as mnemonics for the user. Because the Internet is based upon IP addressing and not domain names, however, network devices replace every host domain name with the host's corresponding IP address prior to initiating communication. This replacement process is facilitated by what is known as a domain name service (DNS).

FIG. 1 illustrates a conventional DNS configuration according to the prior art. Referring to FIG. 1, client 100 transmits the domain name 102 of the host 115 that client 100 wishes to contact over network 101 to DNS server 120. DNS server 120 performs a lookup function in its database 118 and retrieves a corresponding IP address 103 to return to the client 100. Client 100 is then free to establish communication with host 115 using the host's corresponding IP address 103.

It is not uncommon for a single host domain name to be linked to multiple IP addresses within a DNS server. If one or more of a host's IP addresses are changed or are removed from the network, the corresponding DNS entries also need to be changed or removed from the DNS database. One limitation of DNS has historically been its inability to automatically update such address changes. Currently, it is common for DNS updates to be performed manually, often requiring time consuming, meticulous precision. Such manual updates, however, are not limited to just DNS databases. Essential configuration information such as IP addresses have traditionally been assigned to hosts manually as well.

Manual IP address assignments are most often performed by an experienced individual such as a network administrator. The network administrator assigns each host an IP address chosen from a block of addresses known by the administrator to be available. If the administrator were to mistype the IP address when configuring the host, it is likely that the host would not function correctly. Similarly, if the administrator were to assign a previously allocated IP address to a host, communication errors would likely occur due to the conflicting IP addresses. Additional TCP/IP configuration information other than IP addresses is often manually entered as well. Often, the TCP/IP configuration process requires an administrator to visit each host individually to enter the applicable information. Every time a host configuration is subsequently changed, the administrator must also visit the host to perform the update. On large networks, this practice of manually updating configurations can be extremely time consuming.

Dynamic IP address allocation attempts to solve some of the problems created by manual host configuration. Different implementations of dynamic IP address allocation have been proposed over time, but one common protocol used today is the Dynamic Host Configuration Protocol (DHCP). For more information on DHCP, see RFC 2131, "Dynamic Host Configuration Protocol", March 1997. DHCP is based on the Bootstrap Protocol (BOOTP), but adds the capability of automatic allocation of reusable network addresses and additional configuration options. For more information on BOOTP, see RFC 951, "Bootstrap Protocol. (BOOTP)", September 1985. DHCP provides a framework for passing configuration information to hosts on a TCP/IP network at boot time. With DHCP, a network administrator does not need to visit each host individually to configure or modify a host's configuration. A configuration may include the host IP address and other TCP/IP option settings such as the definitions of domain name servers, default gateways and subnet masks. Some DHCP server implementations allow for the use of option sets, which allow administrators to assign common settings to particular options. When an administrator makes a change to an option set, all client configurations employing that option set will receive the updated information. In this manner, central administration is made easier.

FIG. 1 illustrates a conventional DHCP configuration according to prior art. Referring to FIG. 1, upon commencing its bootstrap routine, a DHCP client 100 sends out a DHCP Discover broadcast 105 across network 101 looking for a DHCP server 110 or 111 that can return settings to client 100. Both operational DHCP servers 110 and 111 on network 101 receive the DHCP Discover broadcast 105 from client 100 and determine if they can provide configuration information for that particular client 100. If the DHCP servers 110 and 111 have a configuration for the requesting client 100, they send a DHCP Offer 106 to the DHCP client 100 over network 101. DHCP client 100 analyzes all of the DHCP Offers 106 it has received from DHCP Servers 110 and 111, selects one of the servers, and sends back a DHCP Request 107 over network 101 to the server it chooses, such as DHCP server 110. DHCP server 110 issues a DHCP Acknowledgment 108 to client 100, reserves an IP address, and subsequently delivers the configuration information to client 100 over network 101.

One current problem with networks utilizing DHCP in conjunction with DNS involves the lack of communication between the two systems. As IP addresses are dynamically allocated to hosts, corresponding domain names may also be allocated. In a network where a host's IP address changes frequently, so too will its domain name. Due to the randomness involved in such address/domain name assignments, it is crucial that such assignments be reflected in a DNS. Since DNS updates are often completed manually, it is unlikely, however, that the DNS will reflect the most recent host address/domain name information available. If the DNS is not kept up to date with the most recent host address/domain name assignments, communication between hosts may become increasingly difficult. Even if a DNS database was kept up to date with the most recently available network address/domain name information, it would still be advantageous to identify a single host by a single fixed domain name. With a single fixed domain name, any particular host would always be reachable via that domain name, regardless of what the host's dynamically assigned IP address is.

It is therefore desirable to have a system that is able to dynamically allocate IP addresses to a host, while statically assigning a single domain name to that host. Such a system would perform necessary DNS updates automatically, requiring minimal human interaction with the system, thereby minimizing communication errors.

Once a device is configured, and connected to a network, the network administrator is generally responsible for updating user and group information and allocating access privileges to that device. As the size of the network, number of connected devices, and number of users grows, the process of updating user and group information and granting access privileges can become a formidable task. Often in large office environments, user and group information updates are not considered critical to the functionality of the network and may therefore be assigned a lower priority than other, more urgent system concerns. In small office environments designated network administrators may not even exist, leaving all of the network configurations and administration to be completed by untrained individuals. Such a practice may not only affect productivity, but may also jeopardize the functionality of the network.

It is therefore desirable to have a network device that provides easy, comfortable, and appliance-like automatic configuration features to users. Such a device should be capable of automatically configuring itself for network operation when placed in a network environment that lacks a designated administrator, and at the same time, the device should provide interoperability with preexisting networked equipment when placed in an administered network environment.

SUMMARY OF THE INVENTION

A method and apparatus for initializing a first device on a network is disclosed. First, configuration information is requested from a second device upon connecting the first device to the network. Then, the initialization process is delayed for a period of time. Next, configuration services are provided to the network if a response to the configuration information request is not received from the second device within the period of time that the initialization process is delayed. Configuration services are provided to the network if the first device has a higher priority than the second device. The network is continuously monitored to detect a connection of an additional device to the network.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
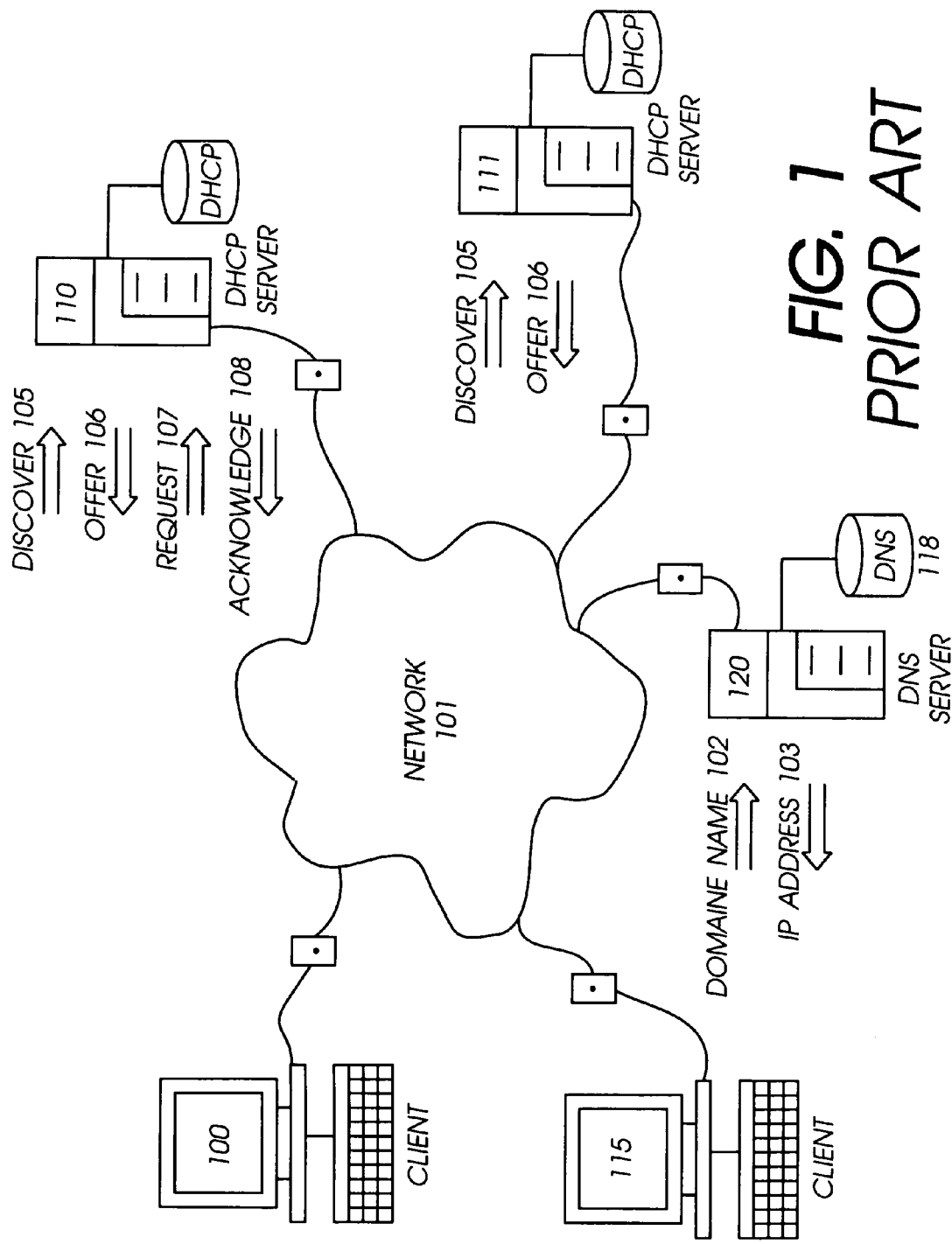
FIG. 1 illustrates a conventional non-NOA network including dynamic host configuration protocol and domain name service servers according to prior art.

A networked office appliance (NOA) architecture is disclosed. In the following description, numerous specific details are set forth such as specific components, configurations, connections, etc., in order to provide a thorough understanding of the present invention. It will be apparent, however, to one skilled in the art that these specific details need not be employed to practice the present invention. In other instances, well known components or methods have not been described in detail in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required processing. The required structure for a variety of these machines will appear from the description below. In addition, the present invention is not described with reference to any particular programming language. It will be appreciated that a variety of programming languages may be used to implement the teachings of the invention as described herein.

Although all or some of the operations may be performed by software executing on one or more processing units/devices (e.g., CPUs) in a computer system or specialized apparatus, some or all of these operations may be performed by digital logic and/or circuitry, an integrated circuit (e.g., ASIC) or other semiconductor substrates.

Overview

A NOA architecture allows appliances to be added to a network without requiring configuration or setup in offices lacking a network administrator. At the same time, a NOA architecture allows appliances to be easily added to standard administered networks without causing conflicts with preexisting network devices. Furthermore, NOAs work closely together in networked environments and are able to automatically detect and share information with one another upon being connected to a network. Some examples of networked office appliances may include, but are not limited to devices such as facsimile machines, copiers, printers, personal computers, scanners, electronic typewriters, data backup systems, control units, . . . etc.

A NOA architecture provides mechanisms for automatically configuring devices on networks, such as TCP/IP networks. Specific configuration methods disclosed herein include network address allocation, DNS database population, network service discovery, and user identity sharing. Devices that follow these algorithms automatically start DHCP and DNS services when they are not already present on a network, and refrain from doing so if such services are already present on a network. Both DHCP and DNS services work together to provide names and addresses to network devices on the same network without human intervention (automatically). In addition, a hypertext transfer protocol (HTTP) based method of securely sharing service information as well as user and group information is defined.

The disclosed architecture and system differ from the prior art by way specific mechanisms are used to configure a network. One such mechanism provides for the detection of existing DNS and DHCP services on a network, while another mechanism controls a device's response when such services are detected. If DHCP and DNS services are detected on a network an NOA device may startup as a client and accept any configuration information offered by the services. If, however, a NOA device does not detect DHCP and DNS services, the NOA device may startup as a server to provide those services to the network. A NOA architecture uses a combination of state variables, timing, and communication protocols to accomplish these tasks.

Service discovery is accomplished within the disclosed automatic network configuration. A designated service device utilizes a unique protocol to gather individual service lists from multiple NOA devices on a network. In doing so, the service device creates a master service list accessible by all NOA devices on the network. In this way, each NOA device is able to identify the services that every other NOA device on the network provides.

User and group information is shared across an automatically configured network. User and group information is information that designates which users are allowed access to an NOA device, as well as what level of access they are allowed. A NOA architecture utilizes a unique protocol in conjunction with the HTTP protocol to pass user and group information between NOA devices. When a NOA device is connected to an automatically configured network, user and group information is passed to that NOA device. NOA devices are able to detect whether the user and group information they are passed is more or less recent than any preexisting user and group information they may already contain. A further mechanism is provided which allows an NOA device to pass the more recent user and group information back to the originating device so that the information may be propagated throughout the network.

NOA architecture provides a further mechanism for solving network name conflicts in the automatically configured network herein described. Since NOA devices are capable of selecting their own network name to which they are assigned, the possibility exists that more than one NOA will select the same name. If this occurs, NOA devices resolve the conflict using a novel conflict resolution process which makes the selected network names unique, yet consistent.

The following sections will further detail the specific mechanisms and protocols utilized in a NOA architecture.

Client NOA Configuration

Figure 2:
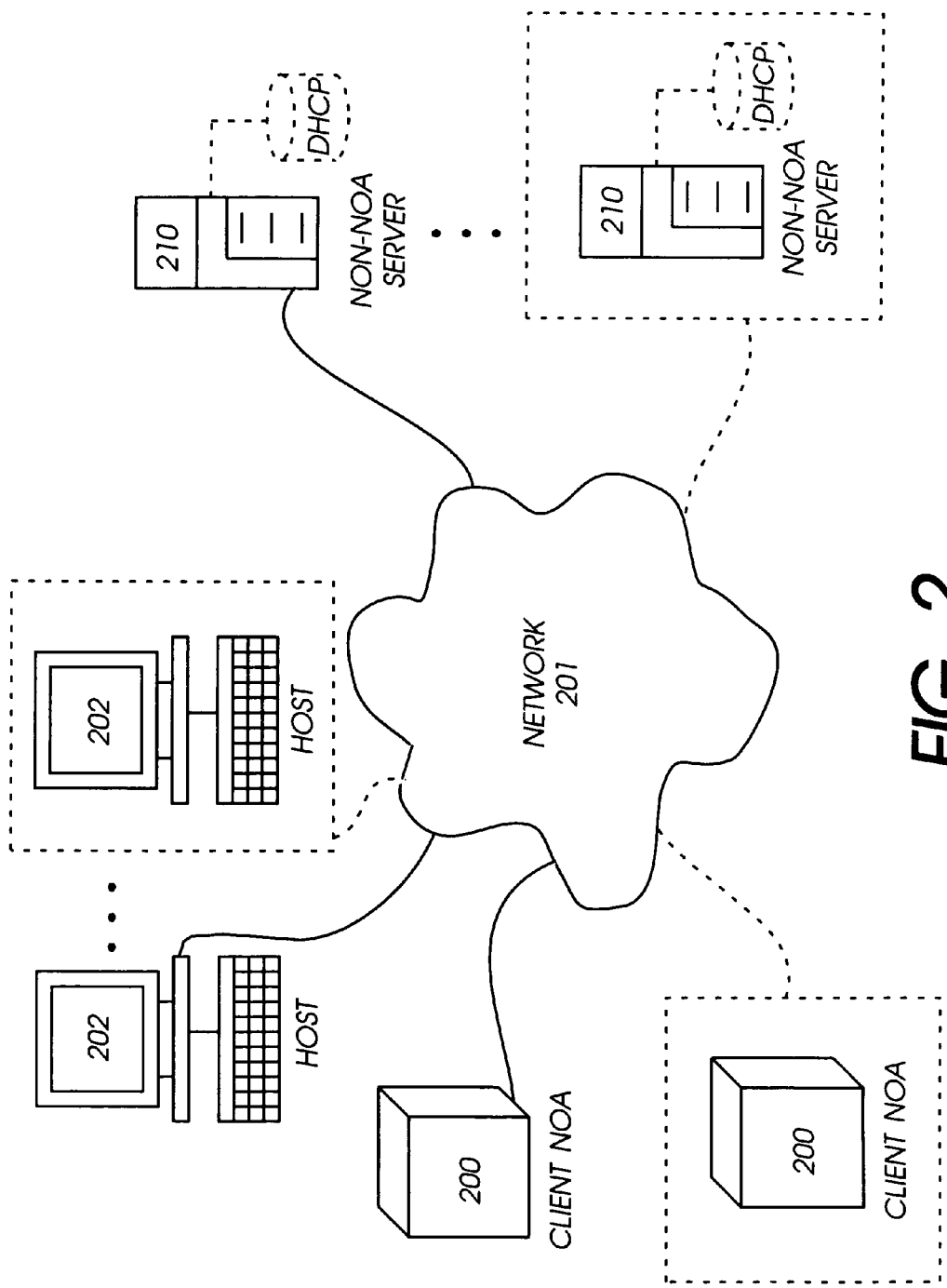
FIG. 2 illustrates one embodiment of a client NOA architecture.

FIG. 2 illustrates one embodiment of a NOA architecture. Referring to FIG. 2, client NOA 200 is connected to network 201. Network 201 may represent the Internet, an intranet, or any other interconnected data path across which multiple devices may share information. Host 202 is a non-NOA networked device that may be connected to network 201, as is non-NOA server 210. Non-NOA server 210 may or may not provide DHCP or equivalent services to network 201. It will be appreciated that any number of hosts 202 or non-NOA servers 210 may be connected to network 201.

Figure 3:
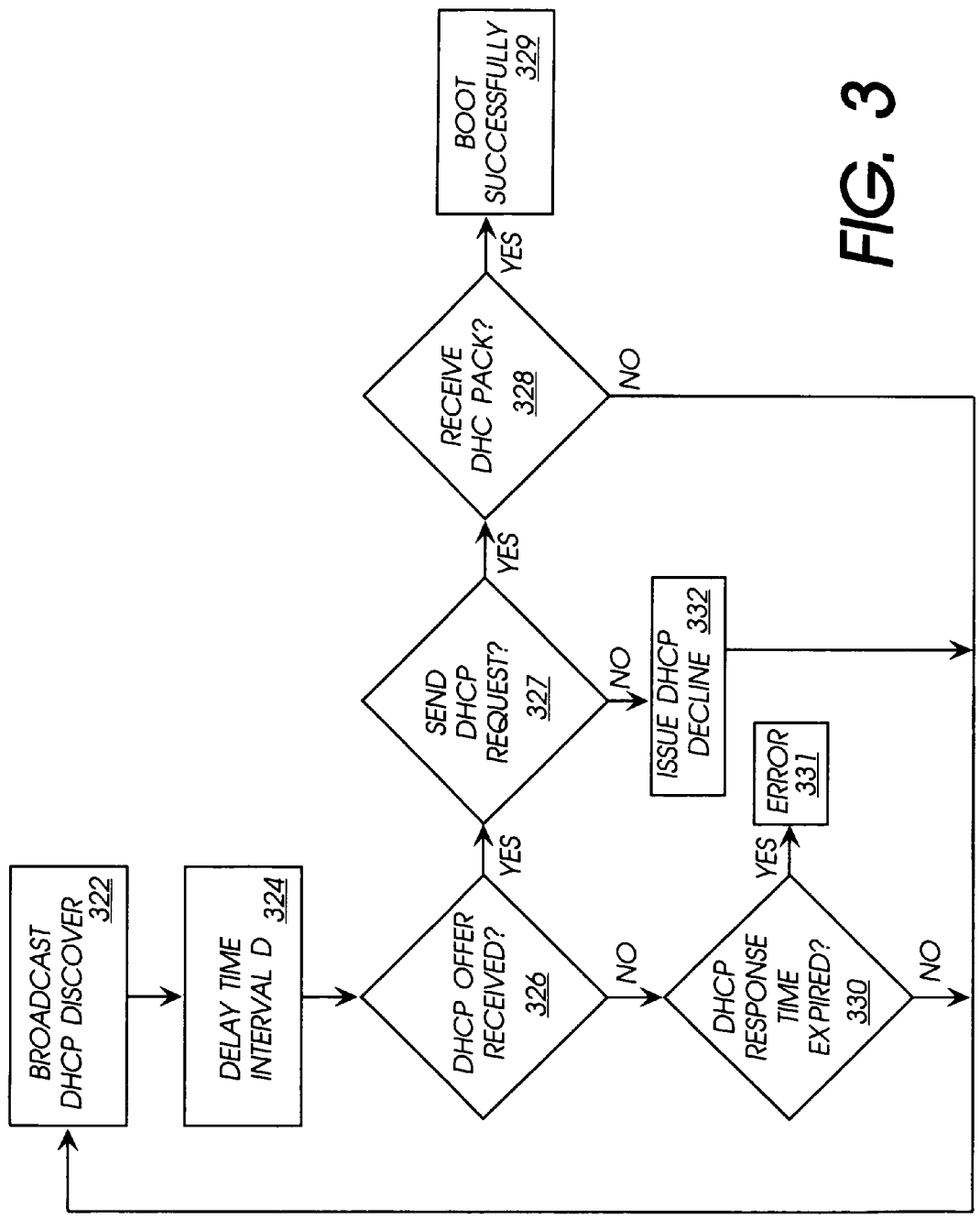
FIG. 3 illustrates one embodiment of a client NOA configuration flow diagram.

FIG. 3 is a flow diagram of one embodiment of a client NOA network configuration. Referring to FIG. 3, upon commencing its bootstrap sequence, client NOA 200 attempts to obtain necessary configuration information required for client NOA 200 to function correctly on network 201. Using DHCP protocol, client NOA 200 broadcasts a DHCP Discover (processing block 322) across network 201 every interval time D until either client NOA 200 receives a DHCP Offer (processing block 326), or a predefined amount of time allotted for a DHCP response expires (processing block 330). The specific delay interval time D at processing block 324 is a measure of time between which successive DHCP Discovers are broadcast at processing block 322. The delay interval time D is alterable as is the predefined amount of time that client NOA 200 will wait for a DHCP Offer at processing block 326. If non-NOA server 210 is configured to provide DHCP services to network 201, non-NOA server 210 responds to client NOA 200 with a DHCP Offer, offering the needed configuration information to client NOA 200. If for any reason, client NOA 200 does not approve of the configuration information offered by non-NOA server 210, client NOA 200 does not send a DHCP Request at processing block 327, but rather issues a DHCP Decline to non-NOA server 210 at processing block 332. Client NOA 200 continues to broadcast DHCP Discovers at processing block 322 until either another DHCP Offer is received at processing block 326, or a predefined amount of time allotted for a DCHP response expires at processing block 330. If, however, client NOA 200 approves of the configuration information offered by non-NOA server 210, client NOA 200 requests the offered configuration information by sending a DHCP Request to non-NOA server 210 at processing block 327. If the configuration information offered to client NOA 200 is still valid and available, non-NOA server 210 transmits a DHCP Acknowledge to client NOA 200 which is received at processing block 328, reserves an IP address for client NOA 200, and begin to transfer the agreed upon configuration information over network 201 to client NOA 200. In this way client NOA 200 may continue to boot successfully at processing block 329. Note that the information may not be valid and available, for instance, when the same address has been offered to several hosts and one of the hosts accepts. At this point, the other offers are no longer valid.

If, for any reason, a DHCP Acknowledge is not received by client NOA 200 at processing block 328, client NOA 200 continues to broadcast DHCP Discovers at processing block 322 until either another DHCP Offer is received at processing block 326, or a predefined amount of time allocated for a DCHP response expires at processing block 330.

In one embodiment, non-NOA server 210 is not configured to provide DHCP or equivalent services to network 201. In this case, client NOA 200 broadcasts a DHCP Discover across network 201 and delays for a specified interval time D at processing block 324 before broadcasting subsequent DHCP Discovers across network 201. Eventually an error condition is triggered at processing block 331 after the predefined amount of time allocated for a DCHP response expires at processing block 330. Once an error condition is triggered, a user or administrator may be alerted by an audio or visual notification indicating that automatic configuration was not possible. A visual error notification may be displayed on any display device that may or may not be connected to the network including a Cathode Ray Tube (CRT). Error condition notifications may alternatively be archived onto a magnetic media in the form of an error log for later retrieval and inspection by an administrator.

In one embodiment, at least two non-NOA servers 210 are connected to network 201 and at least two of these non-NOA servers 210 are configured to provide DHCP services to network 201. Using the DHCP protocol, client NOA 200 broadcasts a DHCP Discover across network 201 at processing block 322, every interval time D until either client NOA 200 receives a DHCP Offer in response at processing block 326, or a predefined amount of time allotted for a DHCP response expires at processing block 330. Non-NOA servers 210 that are configured to provide DHCP services and are able to provide client NOA 200 with configuration information respond to client NOA 200 with a DHCP Offer. If client NOA 200 receives multiple DHCP Offers at processing block 326 from multiple non-NOA servers 210, client NOA 200 determines whether it will accept a configuration and if so, which one of the multiple configurations received it will accept. If client NOA 200 chooses to decline all configurations, client NOA 200 will issue DHCP Declines at processing block 332 to all the non-NOA servers that originated the configurations. Client NOA 200 continues to broadcast DHCP Discovers at processing block 322 until either a more acceptable DHCP Offer is received at processing block 326, or a predefined amount of time allocated for a DCHP response expires at processing block 330. If, however, client NOA 200 chooses to accept one of the configurations offered by one of the non-NOA servers 210, client NOA 200 issues a DHCP Request at processing block 327 to the appropriate non-NOA server 210 that originated the acceptable DHCP Offer. Client NOA 200 issues DHCP Declines at processing block 332 to all non-NOA servers 210 that originated unacceptable DHCP Offers.

It will be appreciated that multiple client NOAs 200 may be connected to network 201. In such an instance, where multiple client NOAs are connected to a single network, the configuration process of any particular client NOA may be identical to the configuration process disclosed for a single client NOA.

Although the configuration is described with respect to a DHCP protocol, other protocols having similar functionality may be used.

NOA Server Self Identification

In one embodiment, networks containing client NOA devices contain two or more NOA server devices. These NOA servers provide configuration services, such as DNS, DHCP, service discovery, and user management features to networks containing client NOAs, and are capable of managing which NOA server will be given priority over the remaining NOA servers at any given time. The NOA server with the highest priority is given the designation of master server and supplies the bulk of the configuration services to the NOA network.

NOA servers are capable of determining whether a device is currently providing configuration services to a network or whether configuration services are required by the network. When an NOA server is connected to a network, the server broadcasts a DHCP Discover across the network. If the NOA server does not receive a DHCP Offer in response to the DHCP Discover, it is likely that no other device is providing configuration services to the network. In such a case, the NOA server begins to provide configuration services to the network. If, however, the NOA server receives a DHCP Offer in response to the DHCP Discover, it is likely that a second device is already providing configuration services to the network. If the NOA server determines that the second device providing configuration services to the network is not a NOA server, the NOA server does not provide similar configuration services, but rather behaves like a client NOA instead. If the NOA server determines that the second device is a NOA server, however, the two NOA servers determine which of them has the higher priority. The NOA server with the higher priority is designated as master server and the server with the lower priority is designated as client NOA. In some circumstances, two NOA servers may not be able to determine which NOA server should be the master server, thereby requiring user intervention. In one embodiment, such circumstances very rarely occur.

In one embodiment, NOA servers capable of providing configuration services to a network are referred to as server NOAs. Server NOA's use a combination of state variables, timing, and communications to accomplish the task of self-identification reliably without user intervention. Server NOAs are generally assigned one of the following four states: 1) Initial, 2) Master, 3) Not_Master, and 4) Temporary_Master. The "Initial" state is assigned to server NOAs when the devices are first manufactured. The state of "Master" is assigned to any server NOA that provides service to a network. Server NOAs assigned the state of "Not_Master" are configured to be server NOAs, but at that particular time, do not provide service to the network. Server NOAs assigned the state of "Temporary_Master" are designed to provide service temporarily when the Master is not available. It is important to determine and capture the previous state of a particular server NOA before bootstrap, as well as the state of the server NOA after bootstrap. In one embodiment, NOA state variables may be defined in an electronic file readable upon bootstrap.

Figure 4:
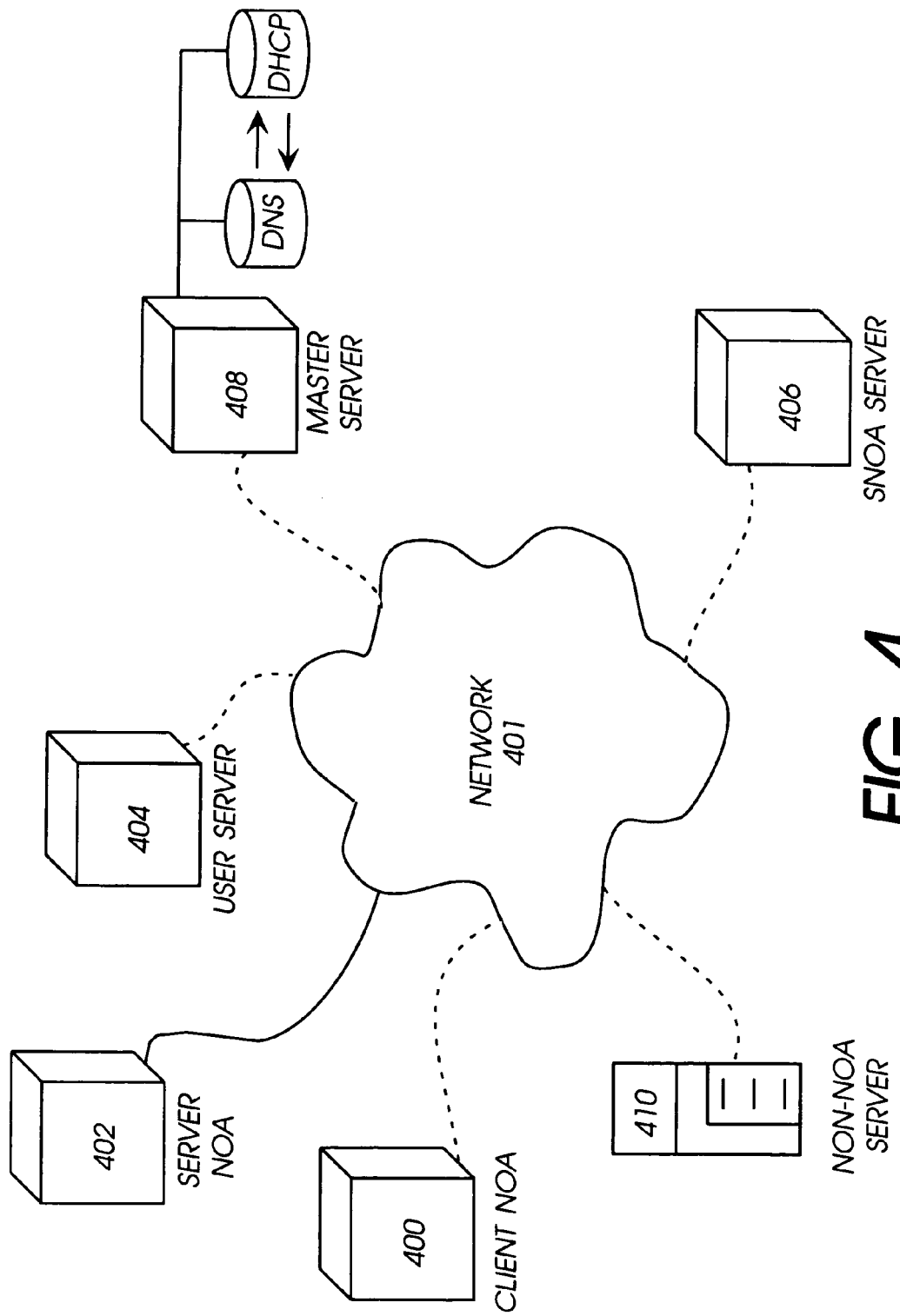
FIG. 4 illustrates one embodiment of a server NOA architecture.

FIG. 4 illustrates one embodiment of a server NOA architecture. Referring to FIG. 4, server NOA 402 is connected to network 401, where network 401 may represent the Internet, an intranet, or any other interconnected data path across which multiple devices may share information. Shown optionally connected to network 401 is client NOA 400, user server 404, master server 408, a server NOA that provides service discovery (SNOA) 406, and a non-NOA server 410. Optional connections are indicative of devices that are not required to be connected to network 401 at all times, but may be connected to network 401 in some instances.

Figure 5:
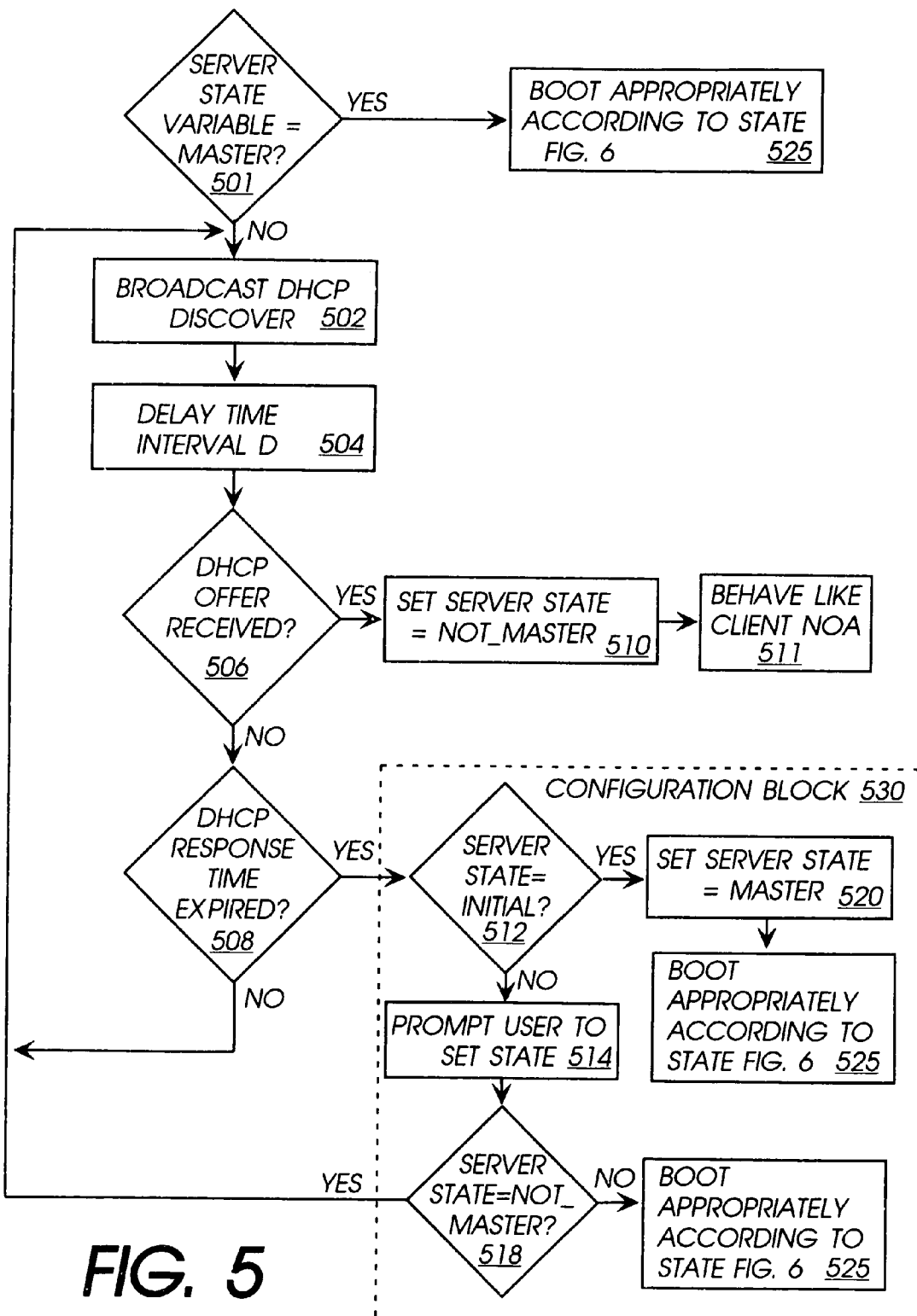
FIG. 5 illustrates one embodiment of a client NOA configuration flow diagram.

FIG. 5 illustrates one embodiment of a server NOA self identification routine. Referring to FIG. 5, upon commencing its bootstrap sequence, server NOA 402 determines whether it should behave as a server NOA and provide network configuration services to network 401, or whether it should behave as a client NOA and not provide network configuration services to network 401. Such a determination is accomplished by referring to the state variable of server NOA 402. In one embodiment, the state variable is set by the system itself. In one embodiment, a user causes the state variable to be set to the master state by selecting it as the master.

The first inquiry is whether server NOA 402 has a state variable equal to Master at processing block 501. If the state variable of server NOA 402 is equal to Master, server NOA 402 should continue to boot appropriately at processing block 525 providing configuration services to network 401. If the state variable of server NOA 402 is not equal to Master at processing block 501, then the state variable is equal to either Not_Master, Temporary_Master, or Initial. Server NOA 402 issues DHCP Discovers across network 401 at processing block 502 every interval time D (504), until either a DHCP Offer is received in response at processing block 506, or a predefined amount of time allotted for a DHCP response expires at processing block 508.

It is important that the amount of time allotted for a DHCP response be varied across multiple server NOAs in order to avoid race conditions between competing DHCP configured servers. If the amount of time allotted for a DHCP response is kept constant, the server NOAs may not function correctly. For example, if multiple server NOAs exist on a network, and all such server NOAs are turned on simultaneously (such as in the case of recovery from power loss, for example), it is conceivable that all the server NOAs may also send out DHCP Discovers simultaneously. If all the server NOAs send out DHCP Discovers simultaneously, all the server NOAs may also wait to receive a DHCP Offer in return. If all the server NOAs are waiting to receive a DHCP Offer, none of the server NOAs can send an expected DHCP Offer. In such a situation, the predetermined amount of time allotted for a DHCP response may simultaneously expire on all server NOAs. Furthermore, each server NOA, believing it is alone on the network, may begin to provide configuration services to the network. If the amount of time allotted for a DHCP response is varied, however, it is likely that at least one server NOA will begin to provide configuration services to the network. It is important that the time be varied by an amount larger than the interval at which DHCP Discovers are repeated. In one embodiment, the variation is in quanta whose size equals the repetition rate. This may be a number of seconds.

Referring back to FIG. 5, after it is determined that the state variable of server NOA 402 is not equal to Master at processing block 501, and server NOA 402 has broadcast a DHCP Discover across network 401 at processing block 502, the next inquiry is to determine whether server NOA 402 receives a DHCP Offer at processing block 506. If server NOA 402 receives a DHCP Offer at processing block 506 before the predefined amount of time allotted for a DHCP response expires at processing block 508, the state variable of server NOA 402 is set to Not_Master at processing block 510 and server NOA 402 continues to behave like a client NOA at processing block 511. It is presumed that if server NOA 402 receives a response to its DHCP Discover, there is another device on network 401 providing configuration services to network 401. In such a case, server NOA 402 does not provide configuration service to network 401 even though it is capable of doing so.

If server NOA 402 does not receive a DHCP Offer at processing block 506 before the predefined amount of time allotted for a DHCP response expires at processing block 508, configuration block 530 is executed. In configuration block 530, the first determination to be made is whether the state variable of server NOA 402 is equal to Initial at processing block 512. If the state variable of server NOA 402 is equal to Initial at processing block 512, and the predefined amount of time allotted for a DHCP response has expired, the state variable of server NOA 402 is set to Master at processing block 520. Server NOA 402 continues to boot appropriately at processing block 525 providing configuration services to network 401. In such a situation, it is likely that server NOA 402 had been in its default shipping state when connected to the network, and no other devices were detected as providing configuration services to network 401.

Referring to configuration block 530 in FIG. 5, if the state variable of server NOA 402 is not equal to Master or Initial, and the predefined amount of time allotted for a DHCP response has expired, user intervention may be required at processing block 514. If user intervention is required, a user may be prompted to select whether the appropriate state variable of server NOA 402 is Master, Temporary_Master, or Not_Master. There is always the possibility that prior to server NOA 402 being connected to network 401, some other device was providing configuration services to network 401. Such a device may have been turned off accidentally, or it may have encountered a functional problem at some point in time. If the other device malfunctioned and is no longer able to provide configuration services to network 401 for example, a user will be prompted to set the state variable of server NOA 402 to either Master, or Temporary_Master. If the other device was mistakenly not turned on, a user will be prompted to set the state variable of server NOA 402 to either Master, Temporary_Master, or Not_Master. If the user selects Not_Master at processing block 518, server NOA 402 again begins to broadcast DHCP Discovers at processing block 502. If the user selects Temporary_Master, server NOA 402 provides configuration services only until a Master server is found. If the user selects the Master state, server NOA 402 continues to boot at processing block 525 providing configuration services to network 401.

Figure 5A:
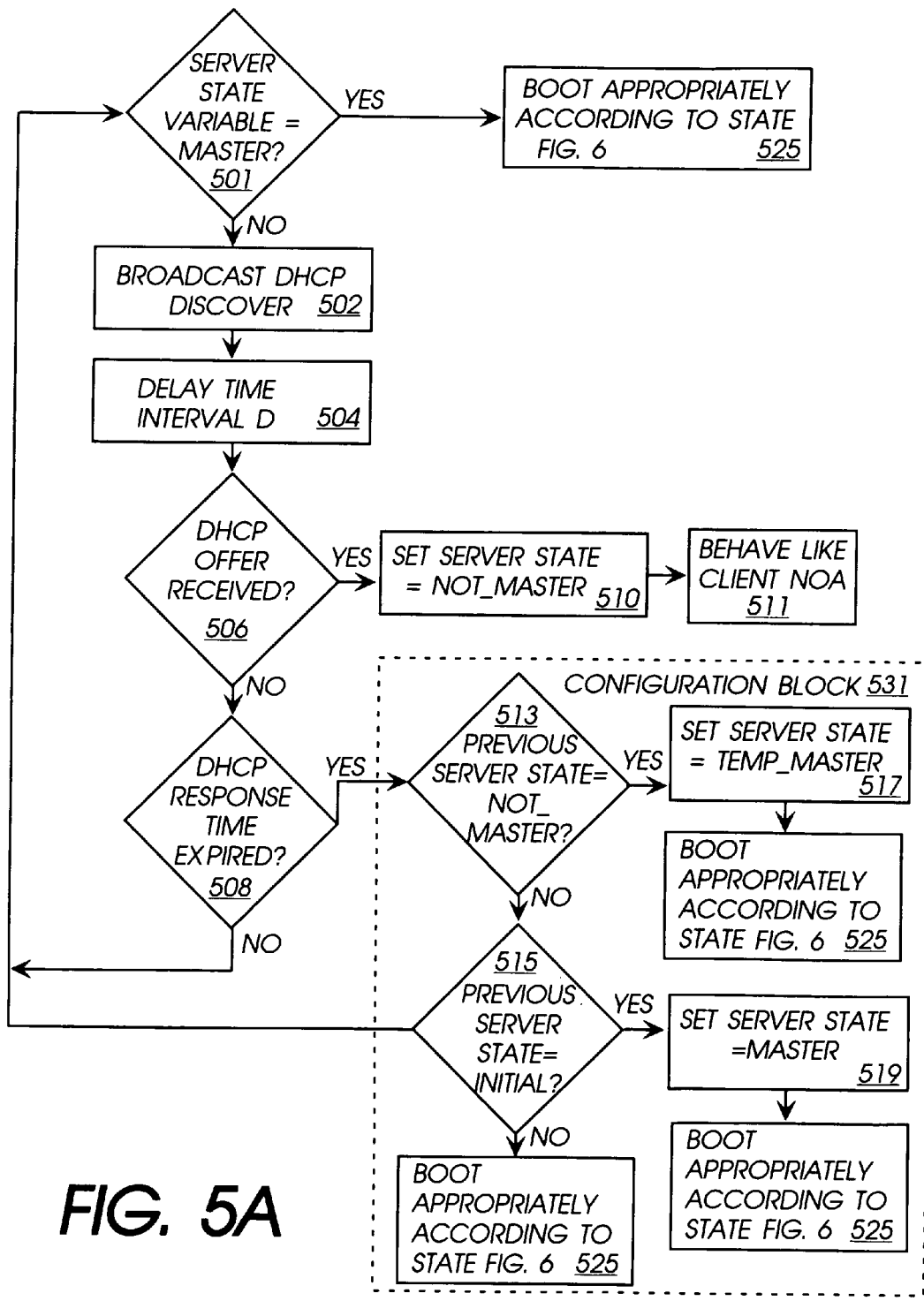
FIG. 5A illustrates an alternative embodiment of a client NOA configuration flow diagram.

FIG. 5A illustrates an alternative embodiment of the server NOA self-identification routine. In FIG. 5A, configuration block 530 has been replaced by configuration block 531. Referring to FIG. 5A, once it is determined that no DHCP Offer has been received at processing block 506, and the time allotted for a DHCP response has expired at processing block 508, configuration block 531 is executed.

If the previous state variable of server NOA 402 is equal to Not_Master at processing block 513, the state variable is set to Temp_Master at processing block 517. If the previous state variable of server NOA 402 is not equal to Not_Master at processing block 513, a determination is made whether the previous state variable is equal to Initial at processing block 515. If the previous state variable of server NOA 402 is equal to Initial at processing block 515, the state variable is set to Master at processing block 519. If the previous state variable of server NOA 402 is not equal to Initial at processing block 515, server NOA 402 continues to boot appropriately at processing block 525 providing configuration services to network 401.

Figure 6:
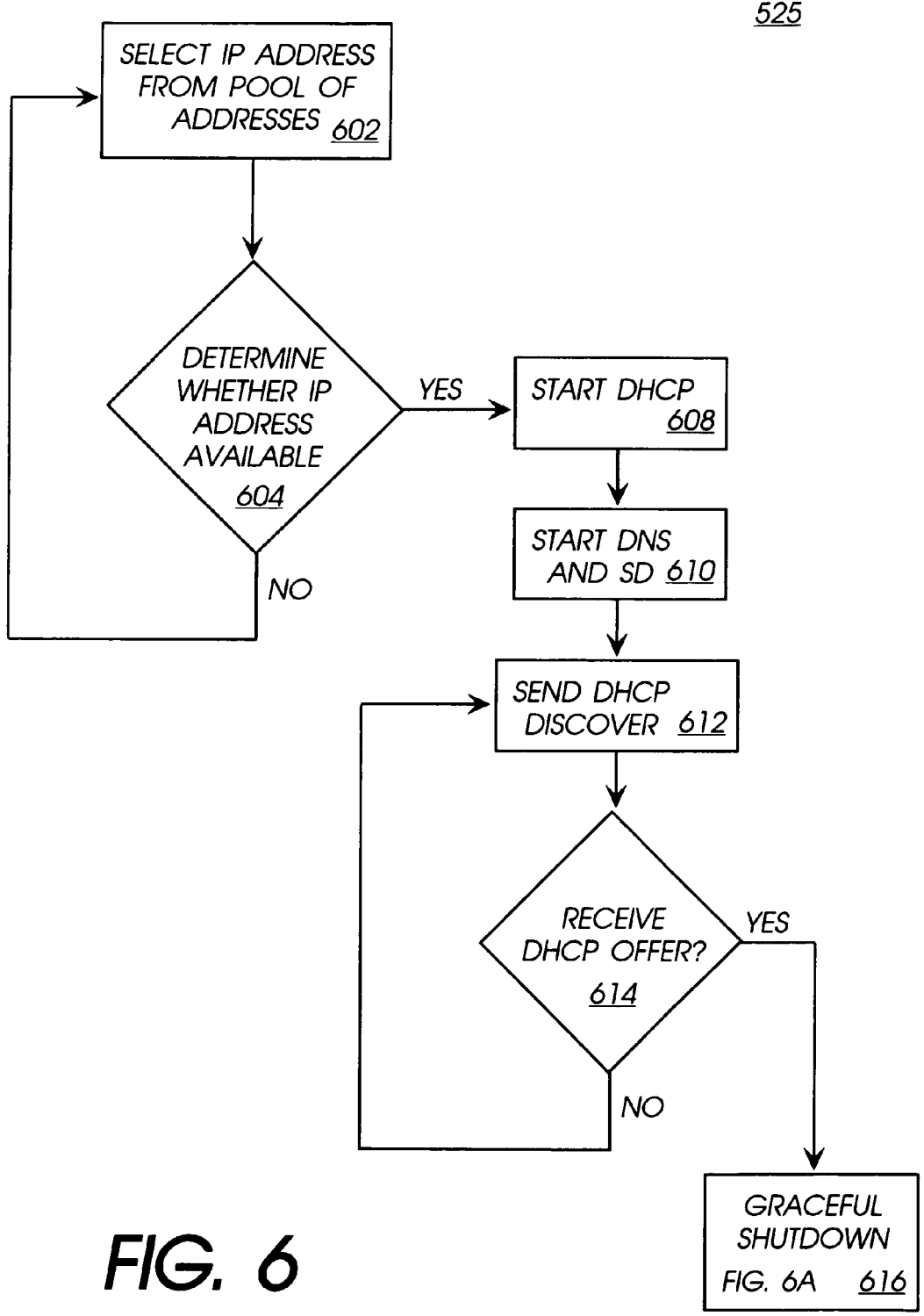
FIG. 6 illustrates a flow diagram of one embodiment of a NOA successful boot procedure.

Once the state variable of server NOA 402 is set appropriately as either Temporary_Master, or Master at processing blocks 517 and 519 respectively, server NOA 402 continues to boot appropriately at processing block 525. The subsequent boot procedure is illustrated in FIG. 6. Referring to FIG. 6, server NOA 402 selects an IP address from a pool of IP addresses at processing block 602. In one embodiment, server NOA 402 first attempts to select a previously used IP address if one exists. After an IP address is selected, server NOA 402 determines at processing block 604 whether the chosen IP address is available for use. In one embodiment, Address Resolution Protocol (ARP) is used to make such a determination. If the address is not available, server NOA 402 selects another IP address from the pool of addresses at processing block 602.

If it is determined that the selected IP address is available, however, server NOA 402 initiates DHCP services at processing block 608, and initiates DNS and service discovery at processing block 610. After the appropriate services have been started, server NOA 402 broadcasts a DHCP Discover across network 401 at processing block 612, and determines whether a DHCP Offer has been received in response to the DHCP Discover at processing block 614. If server NOA 402 detects a DHCP Offer at processing block 614, it is very likely that another device has started providing configuration services to network 401, and server NOA 402 executes graceful shutdown procedure at processing block 616. Conversely, if server NOA 402 does not detect a DHCP Offer at processing block 614, it is very likely that no other server device is providing configuration services to network 401. In that case, server NOA 402 continues to send DHCP Discovers at processing block 612 until a DHCP Offer is received at processing block 614.

DHCP configurations may contain TCP/IP option fields. In an NOA environment, an option field is used to classify server NOAs. A server NOA may be classified as either a High_Priority_Server or an Ordinary_Server. If multiple server NOAs are connected to a network, the server NOA that provides configuration services to the network is designated as High_Priority_Server. Server NOAs designated as an Ordinary_Server function much like client NOAs. There may typically be no more than one High_Priority_Server connected to any particular network at any given time. The High_Priority_Server may be a user-selected server. An identifier in a field of a DHCP Offer is set or not to indicate whether or not the server is a High_Priority_Server. In one embodiment, the High_Priority_Server informs all other servers of its address or identifier.

Figure 6A:
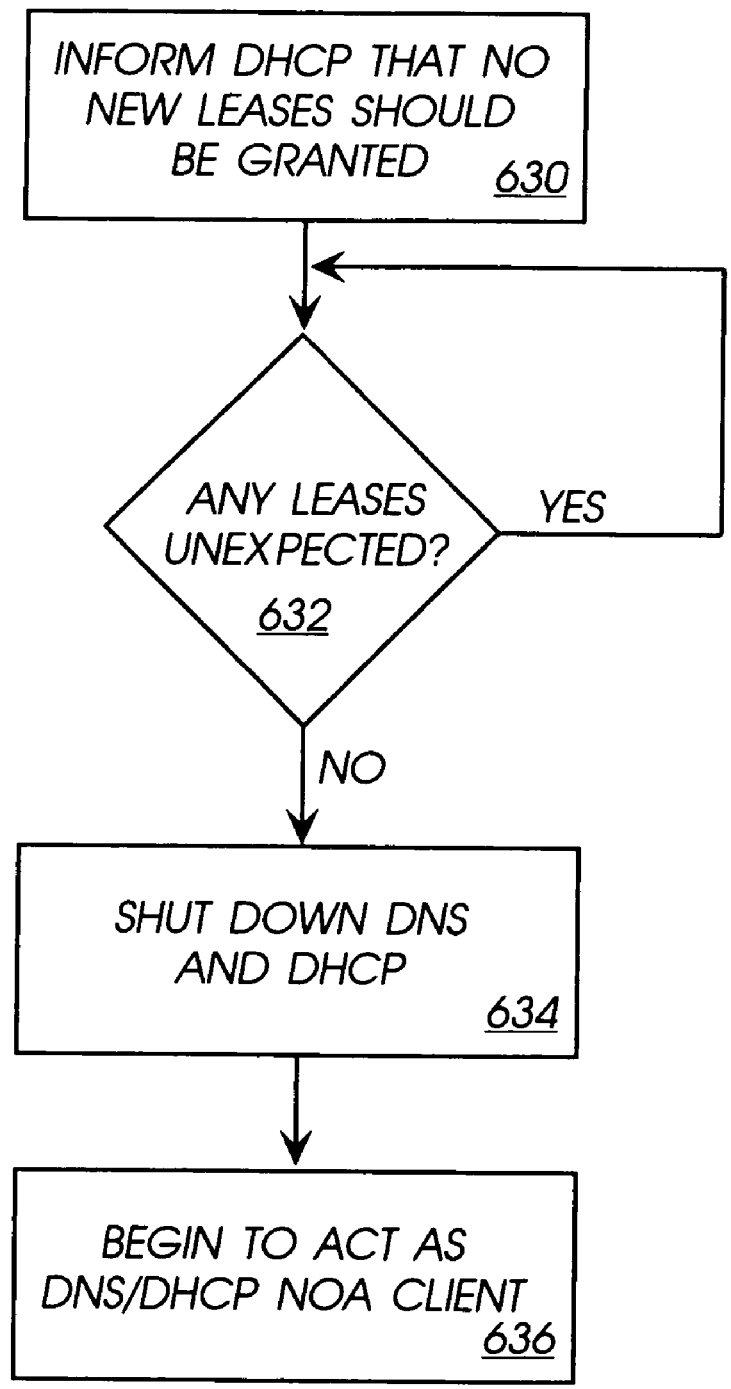
FIG. 6A illustrates a flow diagram of one embodiment of a NOA graceful shutdown procedure.

FIG. 6A illustrates one embodiment of a graceful shutdown procedure. Referring to FIG. 6A, the DHCP is informed that no new leases should be granted (processing block 630). A determination is then made as to whether any leases remain unexpired (processing block 632). DHCP leases have time limits, which the NOA keeps relatively short (e.g., one minute). If so, processing loops back to again test whether any leases are still unexpired. If all the leases have expired, the DNS and DHCP are shut down (processing block 634) and the server NOA begins to act as a DNS/DHCP NOA client (processing block 636).

Network Address and Name Management

NOA devices employ a method where DHCP and DNS services work together so that the name of a host changes as rarely as possible even if its address changes. A NOA architecture attempts to keep network names consistent and moreover employs a method of solving network name conflicts. Traditionally, the user or network administrator has been left to assign or change the network name of a host manually in order to avoid naming conflicts. In contrast, a NOA architecture automates these services, thereby decreasing the amount of required user intervention as well as the risk of errors.

In one embodiment, the DHCP server is implemented on server NOA 402 and contains a table that records network name conflicts and assignments, also referred to as bindings. The DHCP table keeps track of a device's Media Access Control (MAC) address along with the device's corresponding network name binding. A MAC address is a hardware address that uniquely identifies each node of a network. It is conceivable that another identifier, other than a device's MAC address, may be used for identification purposes if a different network topology is implemented. Along with a device's MAC address and network, or host name binding, the table also contains fields for such information as the device's IP address as well as a "name_in_use" code. The name_in_use code, which is initialized upon bootstrap, indicates whether a particular host name is being used by another device.

Figure 7:
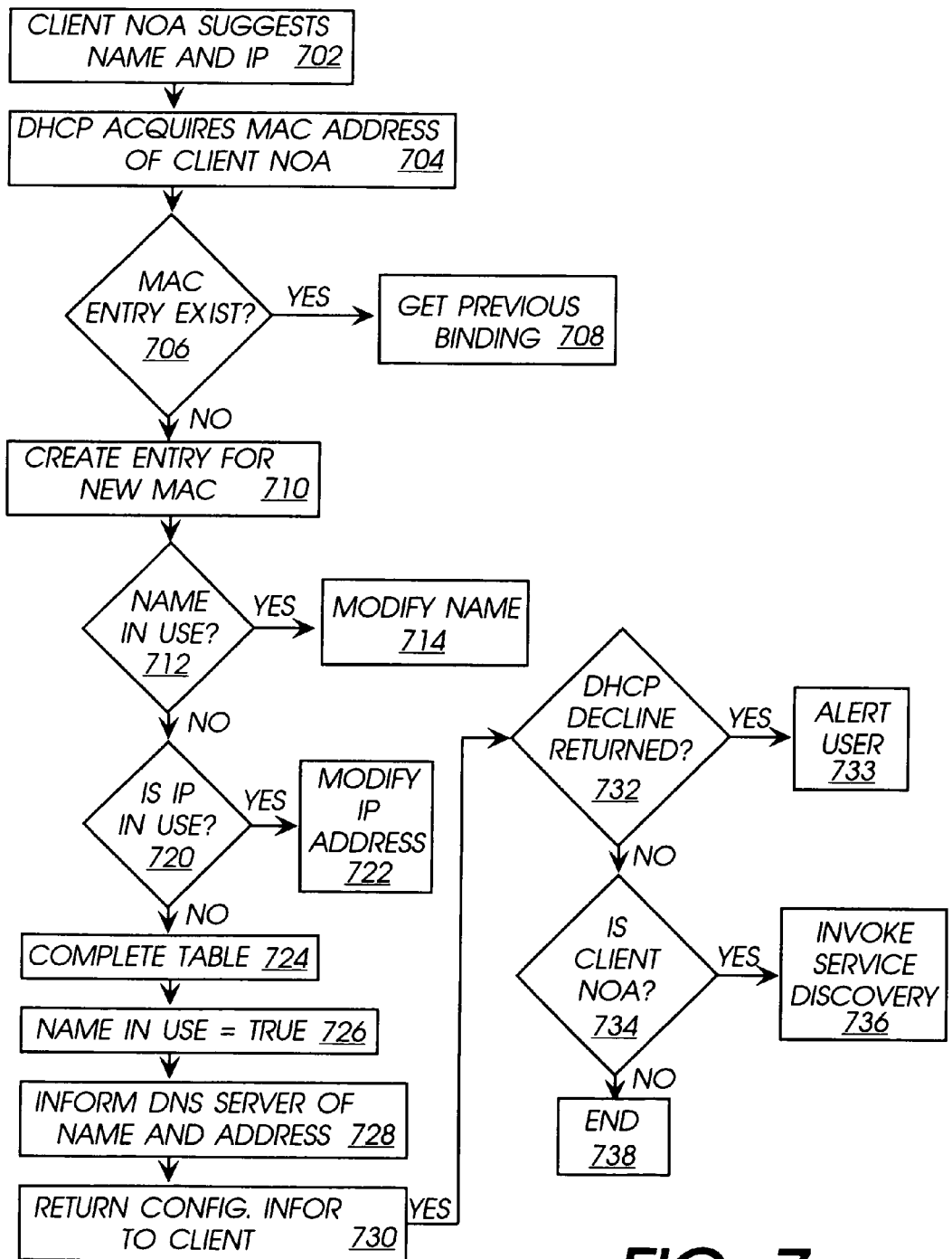
FIG. 7 illustrates one embodiment of a NOA name and address management flow diagram.

FIG. 7 illustrates one embodiment of a NOA name and address management flow diagram. Referring to FIG. 7, upon commencing its bootstrap sequence, client NOA 400 attempts to retrieve configuration information from server NOA 402. At processing block 702, client NOA 400 suggests a desirable IP address and host name for server NOA 402 to use in the configuration of client NOA 400. At processing block 704, server NOA 402 acquires the MAC address of client NOA 400, and at processing block 706 subsequently determines whether that MAC address exists in the DHCP table of server NOA 402. If the MAC address of client NOA 400 does exist in the DHCP table, server NOA 402 retrieves the previous name and address bindings of client NOA 400 at processing block 708. If, however, the MAC address of client NOA 400 does not exist in the DHCP table, server NOA 402 creates an entry for client NOA 400 at processing block 710. At processing block 712, server NOA 402 examines the not_in_use field of the DHCP table to determine whether the selected network name of client NOA 400 is already in use by another device. If it is already in use by another device, server NOA 402 will modify the selected network name at processing block 714. After network name modification, server NOA 402 determines whether the newly modified network name is also in use. Server NOA 402 continues to modify and check the network name of client NOA 400 until a suitable name is established. If, at processing block 712, server NOA 402 determines that the network name of client NOA 400 is not already in use, server NOA 402 thereafter determines whether the IP address of client NOA 400 is in use by another device at processing block 720. If the IP address of client NOA 400 is in use by another device, server NOA 402 modifies the IP address for client NOA 400 at processing block 722. After the IP address of client NOA 400 is modified, server NOA 402 determines whether the new IP address is also in use by another device. Server NOA 402 continues to assign and check the network IP address of client NOA 400 in this manner until a suitable IP address is ascertained.

After a suitable network name and network IP address are determined, all the fields in the DHCP table are completed with the appropriate information at processing block 724. At processing block 726, server NOA 402 records a mark in the name_in_use field indicating that the network name assigned to client NOA 400 has been taken. In this manner, no other devices may attempt to use this network name while it is assigned to client NOA 400. At processing block 728, the DHCP server which in this particular embodiment is server NOA 402, informs the DNS server which, in this particular embodiment is also server NOA 402, of the network name and IP address assignments. Server NOA 402 then returns the configuration information to client NOA 400 via a DHCP Offer at processing block 730. Such configuration information may include the client's network name, IP address, domain name, DNS server address, and router address. At processing block 732, server NOA 402 determines whether a DHCP Decline is returned by client NOA 400. If a DHCP Decline is returned, server NOA 402 may alert a user to determine why the configuration was rejected as shown in step 733. As long as no DHCP Decline is received by server NOA 402, it is presumed that client NOA 400 accepts the configuration information and service discovery will begin at processing block 736. Although it has been assumed that the client described within this name and address management configuration procedure is a client NOA, it is also possible that such a configuration procedure would apply to a non-NOA client configured to accept DHCP configurations. If server NOA 402 were to return configuration information to a non-NOA client, service discovery may not be invoked and the name and address configuration procedure would end at processing block 738.

Name Modification

When a DHCP client sends the host name to DHCP server, it is possible that the name is already in use. At this time, the DHCP server changes the host name to become unique.

In one embodiment, the following process to resolve host name collisions:
1. If requested name is shorter than a predetermined number of characters, (e.g., 15), then add the number digits to the tail of it.
2. If step 1 is not enough to make unique name, then the last character of the modified name is incremented in the alphabetical order.
3. If the last character was checked through a-z and all of the modification is not unique, then the second character from the end is incremented in the numerical/alphabetical order and the last character is modified to start for 0–9, a–z.
4. In one embodiment, this process never adds minus or underscores characters.
5. If the original character is a minus or underscore character, the next character is 0.

Address Ranges

In one embodiment of a NOA, the class A private address range specified by:
  10.xxx.yyy.0~10.xxx.yyy.255 are used.

The section marked "xxx.yyy" is used by the NOA to allow servers to transfer clients smoothly when a new DHCP server takes over from the original NOA server.

The DHCP server allocates client addresses from the following address range.
  10.xxx.yyy.100~10.xxx.yyy.200

This address range contains the address of DHCP server itself, implying that the DHCP server can assign a maximum of 100 addresses. A network administrator wishing to allocate some static addresses, but mostly allow NOAs to configure themselves, can use the following range for static assignments.
  10.xxx.yyy.~10.xxx.yyy.99
  10.xxx.yyy.201~10.xxx.yyy.255

In one embodiment, the network mask of an automatically configured NOA network is 255.0.0.0.

Service Discovery

The NOA network architecture provides an automatic service discovery feature. The SNOA server is responsible for providing the service discovery function to a network. The SNOA server assembles a service list describing service names of each NOA device on the network. Using this service list, each NOA can easily associate itself with other NOAs on the network. A typical SNOA server is a combination of a hypertext transfer protocol (HTTP) daemon and a program that issues HTTP queries. In one embodiment, when automatic configuration is desired, the SNOA server is located on the Master server. In another embodiment, when automatic configuration is not desired, or when the SNC)A server is situated in an administered environment, the SNOA server can be located on a separate device other than the Master server.

In one embodiment, a SNOA service list is constructed using human-readable text data. Each line of text resembles the form:

"service:<servicename>://<FQDN>" where <servicename> represents the type of service a NOA provides, and <FQDN> represents a fully qualified domain name. It is advisable to maintain a naming convention for service names whereas a host name naming convention is not required. In one embodiment, a SNOA server organizes the master service list by requesting each NOA's individual service list using an HTTP query. Both hypertext transfer protocol (HTTP) syntax and service location protocol (SLP) syntax may be utilized to achieve this result. More information on service location protocol (SLP) syntax may be found in RFC 2165, "Service Location Protocol", June 1997.

An example of a HTTP based service list along with service definitions is found below:

Service List service: doc_capture://archive.<dormain name>
service: doc_retrieval://archive.<domain name>
service: lpr://archive.<domain name>
service: lpr://printer.<domain name>
service: doc_retrieval://printer.<domain name>
service: fax_send://fax.<domain name>
service: calendar_schedule://calendar.<domain name>
service: calendar_retrieval://calendar.<domain name>

SERVICE DEFINITIONS

| Name | Meaning |
| --- | --- |
| doc_capture | accepts documents for archiving |
| doc_retrieval | allows retrieval of archived documents |
| lpr | accepts print jobs |
| fax_send | accepts fax pages to send |
| calendar_schedule | schedules a calendar entry |
| calendar_retrieval | retrieves a calendar entry |

In the above example, a NOA device with service name "doc_capture" may accept documents over a network for archival purposes. A representative fully qualified domain name (FQDN) could be "archive.<domain name>" where "archive" indicates the NOA device is of an archival type, and "<domain name>" refers to the local domain name of the network to which the NOA device is connected. Similarly, a NOA device named printer that accepts print jobs may provide the service entitled "lpr. A corresponding service list entry may appear as:

{lpr://printer.<domain name>}

Once the SNOA requests each NOA's individual service list using an HTTP query, the respective NOA's should respond. A representative service list that is returned by an NOA in response to the SNOA's query is shown below:

service: doc_capture://
service: doc_retrieval://
service: lpd://

The format of the service list returned by each NOA is similar to the service list of the SNOA although redundant FQDN information is not passed.

In one embodiment, when a client NOA initiates service discovery, the client NOA pushes its own service list to the SNOA server using a HTTP POST command within its bootstrap sequence. Depending upon which device provides DNS and DHCP service to the network, one of two handshaking procedures will commence.

In one embodiment where an NOA device provides a DNS and DHCP service to a network, all the NOA devices on that network are aware that the SNOA server alias is SNOA.DOMAIN by default. If no specific DOMAIN is required, "local" will be used in its place. In such a case, NOAs push their service lists using HTTP POST to the uniform resource locator (URL) shown below:

http://SNOA.local/SNOA_service_list

In such a situation, "SNOA" is the name of the particular NOA, "local" refers to the current network domain, and "SNOA_service_list" is linked to a mechanism that accepts the service list pushed by the NOAs. A common gateway interface (CGI) program is one mechanism that would achieve the desired result.

In an alternative embodiment, where an existing non-NOA device or multiple devices provide DNS and DHCP service to a network, it is very likely that the network is administered. In such an instance, the network administrator should manually add a DNS entry for the SNOA server as well as the SNOA server's alias to the DNS. It is preferable that the name of the SNOA server be "SNOA" so that other NOA devices can refer to the SNOA server by concatenating "SNOA" and the "DOMAIN" name given by the DHCP server. In the rare circumstance when the name "SNOA" is already used, any name may be chosen as long as all NOA devices are configured to point to the correct URL.

Once a NOA pushes its service list to a SNOA server, the SNOA server registers the service list and remembers the name of the NOA client. When subsequent changes to NOA service take place, the service list maintained in the SNOA server is updated. More specifically, when a new NOA device is added to the network, it pushes its service list to the SNOA server and the SNOA server then distributes this information to all of the other client NOAs that it remembers. It may accomplish this by pushing the clients to the following exemplary URL:

http://HOST.DOMAIN/NOA_service_list

If a network administrator wishes to separate NOAs into several project or organizational work-groups, the administrator can maintain the work-groups by defining respective URLs for the particular SNOA service desired. For example, if the administrator decides to provide a single server for a certain group of NOAs in order to control the service list, the administrator can configure each NOA within the work-group to point to a single URL:

http://SOME_SERVER.DOMAIN/NOA_Service_List_For_Workgroup_3

Similarly, different work-groups may be configured to point to different URLs on a single server:

http://SERVER1.DOMAIN/NOA_Service_List_For_Workgroup_4
http://SERVER1.DOMAIN/NOA_Service_List_For_Workgroup_5
http://SERVER1.DOMAIN/NOA_Service_List_For_Workgroup_6

User Identification

In order to take advantage of NOA functions, it is necessary to first enter a user name followed by a password. There are typically two types of user names: the personal name, and the group name. The group name contains a list of members that are allowed access to the group, whereas the personal name may be considered a special case of the group name which has no member. The file format with which user and password information is stored is not important. NOA systems provide an interface for an application program that will regardless of the file format utilized.

In one embodiment, the first line of a user database is a code which specifies the particular file format, or character encoding used for this file. The next line of the user database is a time stamp which represents the time and date on which the user database was last altered. The time stamp may appear in the following format:

{YYYYMMDDHHMMSS} where YYYY represents the year, MM represents the month, DD represents the day, HH represents the hour, MM represents the number of minutes, and SS represents the number of seconds upon which the user database was last altered. In one embodiment, the date and time are recorded in terms of Greenwich Mean Time (GMT).

After the time-stamp, the NOA user database contains a list of entries that represent users and groups. User entries contain an ID, a full name, a clear text password, and a list of groups of which the user is a member. In contrast, group entries contain a list of groups of which the user is a member, but do not contain a password or other information contained in a user entry. An exemplary six lines from a user database are listed below:

adminNOA:Administrator:adminpassword:
user1: User Name 1 :user1password:admin,group1, group2
user2: User Name 2 :user2password:group1
group1: Group Name 1:
group2: Group Name 2:
group3: Group Name 3:group2

Passwords are stored in clear text form on NOAs rather than being stored in encrypted form as is the usual practice in similar circumstances. This is done because individual passwords need to be reused under multiple password hashing schemes for some NOAs. Transfers of the user database between NOAs, however, are encrypted. Such an encryption mechanism should ensure that hosts masquerading as NOAs are not granted access without obtaining a security code of some sort. The particular encryption algorithm used is not important, as long as the devices in question use the same protocol to establish encryption keys.

Figure 8:
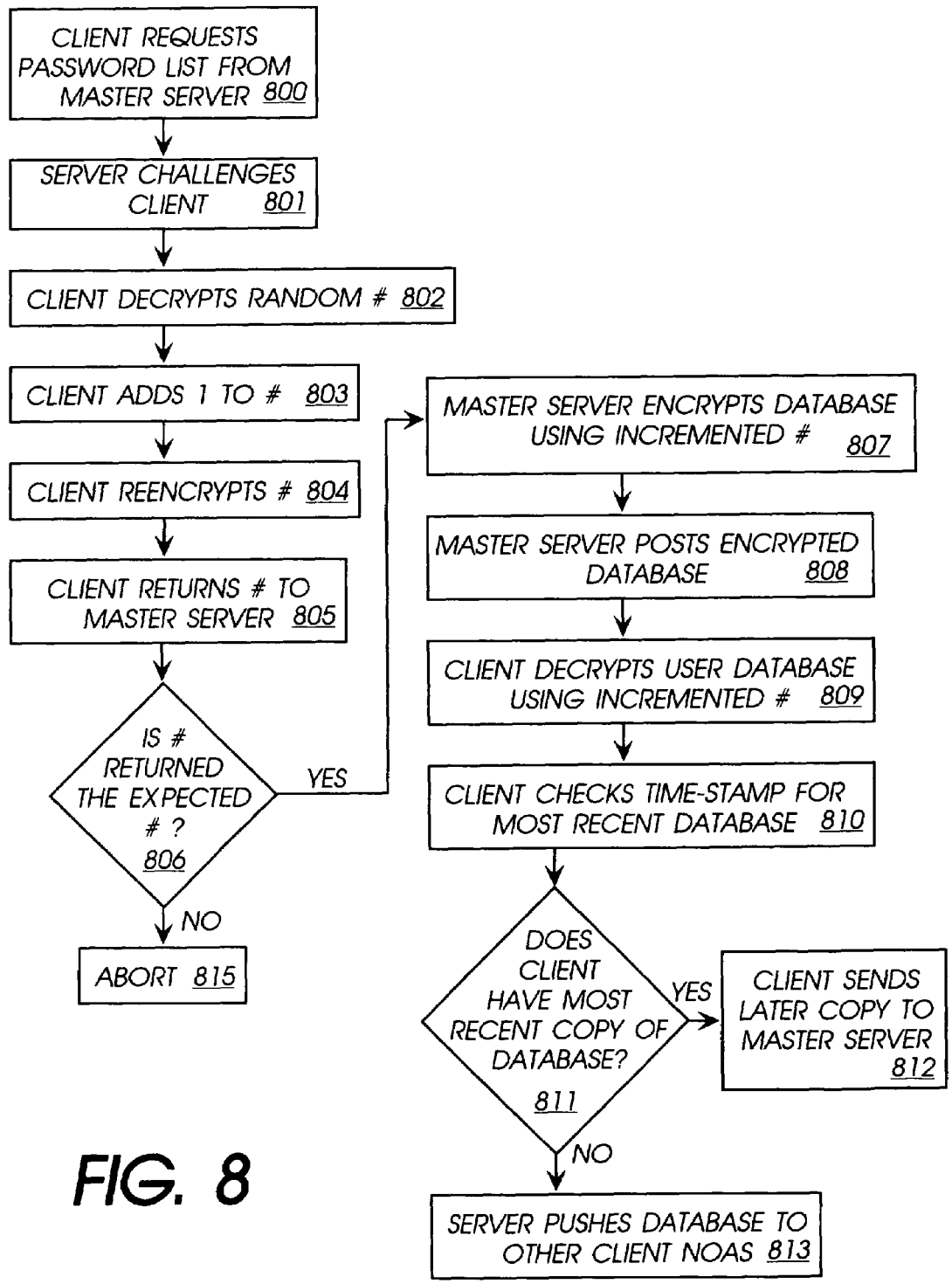
FIG. 8 illustrates a flow diagram of one embodiment of a NOA password distribution routine.

FIG. 8 illustrates a flow diagram of one embodiment of a password distribution routine. The user identification procedure which includes password distribution may be implemented on a number of devices. In a network environment that lacks a designated administrator, user identification services are located on the same device as SNOA services. Since SNOA services are typically located on the Master server in an such a network environment, user services should also be located on the Master server. In administered network environments, user identification services may be located on a separate device, typically referred to as a user server.

Referring to FIG. 8, a client connected to a NOA network requests a password list from a Master server using a CGI program named "noa_request_users" at processing block 800. At processing block 801, the Master server challenges the client NOA with a random number that was encrypted using the security code of the client NOA. This is accomplished using a CGI program named noa_request_key. The client NOA then decrypts the random number using its security code, adds 1 to the number, and reencrypts the resulting number in steps 802, 803 and 804 respectively. At processing block 805, the client NOA returns the reencrypted number to the Master server. At processing block 806, the server determines whether the number returned by client NOA is the number the server expected to have returned to it. If the number returned is not the expected number and is therefore not correct, the transaction is aborted for security purposes at processing block 815. If the number returned to the Master server by the client NOA is correct, however, the Master server encrypts the user database using the incremented number at processing block 807. The Master server subsequently POSTS the encrypted user database via HTTP, and invokes a CGI program named accept_userdb at processing block 808. The client NOA decrypts the user database using the incremented random number at processing block 809 completing the database transfer routine. The client NOA now checks a time-stamp in the user database to determine whether the client NOA or the Master server has the most recent user database. If it is determined at processing block 811 that the client NOA has the most recent copy of the user database, the client NOA sends the later copy of the user database to the Master server at processing block 812 by repeating steps 801–809 as herein described. The Master server then pushes the most recent database to all other client NOAs on the network at processing block 813 by repeating steps 801–812 as herein described. If it is determined at processing block 811 that the Master server has the most recent copy of the user database, there is no need for the client NOA to send its user database to the Master server. Master server then pushes its user database to all other client NOAs on the network by repeating steps 801–812.

Note that other password distribution routines may be used.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for providing dynamic configuration services comprising:

requesting, with a local device, configuration services from a first remote device over a network in response to connecting the local device to the network, the requested configuration services including acquiring an IP (Internet protocol) address and a domain name for the local device from the first remote device, wherein the first remote device operates as a DHCP (dynamic host configuration protocol) server to the network;

operating the local device as a configuration services server to provide configuration services to one or more second remote devices of said network if the response to the requested configuration services is not received by the local device from said first remote device within a predetermined period of time or if the response to the requested configuration services is received by the local device from said first remote device within the predetermined period of time and the response indicates that the local device has a higher priority than the first remote device, wherein the local device is operated as a DHCP server to the network to provide the configuration service, the configuration services provided by the local device including assigning an IP address and allocating a domain name for each of the second remote devices; and operating the local device as a configuration services client to receive configuration services from said first remote device if the response is received within the predetermined period of time and said first remote device has a higher priority than said local device, wherein the local device is configured to use the received configuration services from the first remote device when entering the network, including acquiring an IP address and a domain name for the local device from the first remote device, wherein the local device utilizes the acquired IP address and domain name to boot the local device up and enter the network using the acquired IP address and domain name as an identity representing the local device in the network.

2. The method defined in claim 1, wherein priorities of the local device and the first remote device are determined based on information obtained from a field compatible with an option field of TCP/IP packets exchanged between the local device and the first remote device, and wherein the local device is configured to operate as the configuration services server if information stored in the option field of the TCP/IP packets indicates that the priority of the local device is higher than the first remote device, even if the first remote device is configured to operate as a configuration services server.

3. The method defined in claim 2, further comprising:
periodically sending by the local device a DHCP discover message across the network until the predetermined period of time expires;
determining whether a DHCP offer is received by the local device before the predetermined period of time expires;
in response to the DHCP offer received from the first remote device within the predetermined period of time, the local device sending a DHCP request to the first remote device for requesting information from the DHCP offer;
in response to the DHCP request, the local device receiving the requested configuration information from the first remote device including the requested IP address; and
the local device using the received configuration information to boot the local device into the network.

4. The method defined in claim 3, further comprising maintaining a DHCP table within the local device when the local device is operating as a configuration services server, wherein the DHCP table includes information regarding an IP address and a network name associated with each of the second remote devices in the network.

5. The method defined in claim 4, further comprising:
in response to a request for a network name from one of the second remote devices, the local device, operating as a configuration services server, detecting a network name conflict via the DHCP table regarding the requested network name;
the local device resolving said network name conflict using the DHCP table; and
the local device recording a code in the DHCP table to indicate said network name conflict.

6. The method defined in claim 5, further comprising:
receiving a request for modifying a network name from one of the second remote devices;
if the requested modified network name is in conflict with another network name used by another one of the second remote devices based on the DHCP table, the local device converting the requested modified network name into a unique network name by appending one or more numbers to the requested modified network name, if the requested modified name is not longer than a predetermined length; and
if after appending the one or more numbers, the modified network name is not unique, incrementing the last character of the modified name in an alphabetical order attempting to make the modified network name unique.

7. The method defined in claim 6, further comprising:
maintaining within the local device operating as a configuration services server, a user database for storing user information of the one or more second remote devices in the network, wherein the user database is implemented according to at least a portion of the following structures:
adminNOA:Administrator:adminpassword:
user1: User Name 1: user1password:admin,group1, group2
user2: User Name 2: user2 password:group1
group1: Group Name 1:
group2: Group Name 2:
group3: Group Name 3: group2.

8. The method of claim 1, wherein the local device is associated with one of a plurality of operating states, the plurality of operating states including an initial state, non-master state, temporary master state, and a master state, wherein whether the local device should operate as a client device or a server device is determined based on the operating state the local device is being associated at a point in time.

9. The method of claim 8, wherein the master state is assigned when the local device is configured to provide configuration services to the network, wherein the initial state is assigned when the local device is manufactured, wherein the non-master state is assigned when the local device is configured as a server device but does not currently provide services to the network, and wherein temporary master state is assigned when the local device temporary provides configuration services to the network while a master server is unavailable and until the master server becomes available.

10. The method of claim 8, wherein if the local device is in the master state when it enters the network, the local device operates as the configuration services server to provide configuration services to rest of the members in the network if the local device has a highest priority than the rest of the server devices in the network.

11. The method of claim 10, wherein if the local device is not in the master state when it enters the network, the local device transmits a broadcast message to the network to request configuration services from any server device of the network.

12. The method of claim 11, wherein if a response associated with the request is received by the local device from the first remote device within a predetermined period of time, the local device transitions to the non-master state and operates as a client device that receives the configuration services from the first remote device and is configured using the received configuration services.

13. The method of claim 12, further comprising:
determining whether the local device is in the non-master state if the response is not received within the predetermined period of time;
transitioning the local device into the temporary master state if the local device is in the non-master state; and
operating the local device as a temporary configuration server to provide temporary configurations services to the network until a remote configuration server becomes available which takes over the temporary services provided from the local device.

14. The method of claim 13, further comprising:
the local device substantially concurrently transmitting a discovery message to the network to discover whether another server device becomes available; and
the local device informing the network that no more new configuration service is available from the local device, if a response with respect to the discovery message is received by the local device from the another server device.

15. The method of claim 14, further comprising:
the local device determining whether at least one other device of the network is still subscribing configuration services from the local device; and
the local device terminating the configuration services if no more other device of the network is subscribing the configuration services from the local device.

16. The method of claim 15, further comprising operating the local device as a client device to the another server device to receive further configuration services after terminating the configuration services of the local device.

17. The method of claim 13, further comprising:
determining whether the local device is in the initial state if it is determined that the local device is not in the non-master state when the response is not received within the predetermined period of time;
transitioning the local device into the master state if the local device was in the initial state; and
operating the local device as a server device to provide configuration services to the network.

18. The method of claim 17, further comprising:
prompting a user for entering an operating state that the local device is intended to enter; and
operating the local device as a temporary server device or a master server device if the user entered operating state is not a non-master state.

19. A method comprising:
determining service capability of a local device coupled to a network including whether said local device is capable of providing configuration services to one or more remote devices of said network;
operating the local device as a server device to provide configuration services to the one or more remote devices from the local device of said network if configuration services are not provided by a network device of the network having a higher priority than said local device, the provided configuration services including supplying user and group information to the one or more remote devices of the network, and allocating and assigning an IP address and network name to each of the one or more remote devices, wherein priorities of the local device and the network device are determined based on information stored in a standard option field of TCP/IP packets exchanged between the local device and the network device; and
operating said local device as a client device to receive configuration services from a remote device if said remote device has a higher priority than said local device, wherein the local device is configured to use the received configuration services from the remote device when entering the network, wherein the received configuration services include obtaining user and group information, an IP address, and network name from the network device, and wherein the local device utilizes the obtained user and group information, an IP address, and network name as an identity representing the local device in the network.

20. The method defined in claim 19, wherein supplying user and group information comprises:
the network device detecting when said local device is connected to said network;
the network device sending a first user and group list to said local device in response to said local device connecting to said network;
said local device comparing said first user and group list with a second user and group list resident on said local device; and
said local device determining whether said first user and group list or said second user and group list is more recent;
the network device receiving a more recent user and group list from said local device;
the network device updating said user and group information to reflect said more recent user and group list; and
propagating said updated user and group information throughout said network.

21. The method defined in claim 20, wherein a time-stamp is used to determine whether said first user and group list or said second user and group list is more recent; wherein the time-stamp is implemented according to a following format:
{YYYYMMIDDHHMM2SS}, "YYYY" representing a year, "MM1" representing a month, "DD" representing a day, "HH" representing an hour, "MM2" representing a minute, and "SS" representing a second, when a respective user and group list is received.

22. The method defined in claim 20, wherein updating said user and group information comprises recording said more recent user and group list in clear text.

23. The method defined in claim 22, wherein updating said user and group information comprises encrypting said user and group information prior to transmission across said network.

24. The method defined in claim 19, further comprising:
correlating said network address and said network name; and
storing said correlated network address and said correlated network name in a table.

25. The method defined claim 19, wherein said network name is suggested by said local device.

26. The method defined in claim 19, wherein HyperText Transfer Protocol (HTTP) is used to exchange information.

27. The method defined in claim 19, wherein Service Location Protocol (SLP) is used to exchange information.

28. A device configured to:
requesting a first network address from a first remote device coupled over a network;
operate as a server device to provide network configuration services to a second remote device of the network, if said first network address is not received from said remote device within a predetermined period of time;
communicating with the first remote device over the network to determine whether a priority level of the device is higher than the first remote device, if said first network address is received from said remote device, wherein priorities of the device and the first remote device are determined based on information stored in a standard option field of TCP/IP packets exchanged between the device and the first remote device;
operate as a server device to provide said network configuration services to members of the network including the first remote device and the second remote device if said priority level is higher than a second priority level of said remote device, wherein the first remote device operates as a client device for receiving the configuration services in response to the determination of the priority level; and operate as a client device to receive configuration services from said first remote device if said remote device has a higher priority than said device, wherein said device is configured to use the received configuration services from the first remote device when entering the network.

29. The device defined in claim 28 further configured to automatically:
assign a second network address;
assign a network name;
correlate said second network address with said network name; and
record said correlated second network address and said correlated network name in a table.

30. The device defined in claim 29, wherein said table further comprises:
a Media Access Control (MAC) address; and
a code to indicate a conflict with said network name.

31. The device defined in claim 29, wherein said first and second network addresses comprise Internet Protocol (IP) addresses.

32. A network comprising:
a first device configured to
assign an address to a second device on said network;
assign a network name to said second device on said network;
supply user and group information across said network; and
determine service capability of said second device on said network,
wherein if said first device is capable of providing configuration services to said network;
operate as a server device to provide configuration services to one or more devices of said network if configuration services are not provided by a network device having a higher priority than said first device, wherein priorities of the first device and the network device are determined based on information stored in a standard option field of TCP/IP packets exchanged between the first device and the network device; and
operate as a client device to receive configuration services from said remote device if said remote device has a higher priority than said first device, wherein the first device is configured to use the received configuration services from the remote device when entering the network, wherein the received configuration services include obtaining user and group information, an IP address, and network name from the network device, and wherein the first device utilizes the obtained user and group information, an IP address, and network name as an identity representing the first device in the network.

33. An apparatus comprising:
means for requesting, with a local device, configuration services from a remote device coupled to the network in response to connecting the local device to the network, the requested configuration services including acquiring an IP (Internet protocol) address and a domain name for the local device from the first remote device, wherein the first remote device operates as a DHCP (dynamic host configuration protocol) server to the network;

means for operating the local device as a configuration services server to provide configuration services to one or more remote devices of said network if the response to the requested configuration services is not received by the local device from said remote device within a predetermined period of time or if the response to the requested configuration services is received by the local device from said remote device within the predetermined period of time and the response indicates that the local device has a higher priority than the remote device, wherein the local device is operated as a DHCP server to the network to provide the configuration service, the configuration services provided by the local device including assigning an IP address and allocating a domain name for each of the second remote devices; and means for operating the local device as a client device to said remote device if the response is received within the predetermined period of time and said remote device has a higher priority than said local device, wherein the local device is configured using the received configuration services from the remote device when entering the network, including acquiring an IP address and a domain name for the local device from the first remote device, wherein the local device utilizes the acquired IP address and domain name to boot the local device up and enter the network using the acquired IP address and domain name as an identity representing the local device in the network.

34. The apparatus defined in claim 33, wherein priorities of the local device and the first remote device are determined based on information obtained from a field compatible with an option field of TCP/IP packets exchanged between the local device and the first remote device, and wherein the local device is configured to operate as the configuration services server if information stored in the option field of the TCP/IP packets indicates that the priority of the local device is higher than the first remote device, even if the first remote device is configured to operate as a configuration services server.

35. The apparatus defined in claim 34, further comprising:
periodically sending by the local device a DHCP discover message across the network until the predetermined period of time expires;
determining whether a DHCP offer is received by the local device before the predetermined period of time expires;
in response to the DHCP offer received from the first remote device within the predetermined period of time, the local device sending a DHCP request to the first remote device for requesting information from the DHCP offer;
in response to the DHCP request, the local device receiving the requested configuration information from the first remote device including the requested IP address; and
the local device using the received configuration information to boot the local device into the network.

36. The apparatus defined in claim 35, further comprising means for maintaining a DHCP table within the local device when the local device is operating as a configuration services server, wherein the DHCP table includes information regarding an IP address and a network name associated with each of the second remote devices in the network.

37. The apparatus defined in claim 36, further comprising:
in response to a request for a network name from one of the second remote devices, the local device, operating as a configuration services server, means for detecting a network name conflict via the DHCP table regarding the requested network name;

means for the local device resolving said network name conflict using the DHCP table; and means for the local device recording a code in the DHCP table to indicate said network name conflict.

38. The apparatus defined in claim 37, further comprising:

receiving a request for modifying a network name from one of the second remote devices;

if the requested modified network name is in conflict with another network name used by another one of the second remote devices based on the DHCP table, the local device converting the requested modified network name into a unique network name by appending one or more numbers to the requested modified network name, if the requested modified name is not longer than a predetermined length; and if after appending the one or more numbers, the modified network name is not unique, incrementing the last character of the modified name in an alphabetical order attempting to make the modified network name unique.

39. The apparatus defined in claim 38, further comprising:

maintaining within the local device operating as a configuration services server, a user database for storing user information of the one or more second remote devices in the network, wherein the user database is implemented according to at least a portion of the following structures:

adminNOA:Administrator: adminpassword:

user1: User Name 1: user1 password:admin,group1, group2 user2: User Name 2: user2 password:group1 group 1: Group Name 1:

group2: Group Name 2:

group3: Group Name 3:group2.

40. An apparatus comprising:

means for assigning an address to a local device on said network;

means for assigning a network name to said local device;

means for supplying user and group information across said network; and means for determining service capability of said local device including whether said local device is capable of providing configuration services to one or more remote devices of said network;

means for providing configuration services to one or more devices of said network if configuration services are not provided by a network device having a higher priority than said local device, the configuration services being provided to the network device having a lower priority than the local device, wherein priorities of the local device and the network device are determined based on information stored in a standard option field of TCP/IP packets exchanged between the local device and the network device; and means for operating as a client device to receive configuration services from a remote device if said remote device has a higher priority than said local device, wherein the local device is configured using the received configuration services from the network device when entering the network, wherein the received configuration services include obtaining user and group information, an IP address, and network name from the network device, and wherein the local device utilizes the obtained user and group information, an IP address, and network name as an identity representing the local device in the network.

41. The apparatus defined in claim 40, wherein the means for supplying user and group information comprises:

means for detecting when said local device is connected to said network;

means for sending a first user and group list to said local device in response to said local device connecting to said network;

means for said local device comparing said first user and group list with a second user and group list resident on said local device; and means for said local device determining whether said first user and group list or said second user and group list is more recent;

means for receiving a more recent user and group list from said local device;

means for updating said user and group information to reflect said more recent user and group list; and means for propagating said updated user and group information throughout said network.

42. The apparatus defined in claim 41, wherein a time-stamp is used to determine whether said first user and group list or said second user and group list is more recent, wherein the time-stamp is implemented according to a following format:

{YYYYMM1DDHHMM2SS}, "YYYY" representing a year, "MM1" representing a month, "DD" representing a day, "HH" representing an hour. "MM2" representing a minute, and "SS" representing a second, when a respective user and group list is received.

43. The apparatus defined in claim 41, wherein means for updating said user and group information comprises means for recording said more recent user and group list in clear text.

44. The apparatus defined in claim 43, wherein means for updating said user and group information comprises means for encrypting said user and group information prior to transmission across said network.

45. The apparatus defined in claim 40, further comprising:

means for correlating said network address and said network name; and means for storing said correlated network address and said correlated network name in a table.

46. The apparatus defined claim 40, wherein said network name is suggested by said local device.

47. The apparatus defined in claim 40, wherein HyperText Transfer Protocol (HTTP) is used to exchange information.

48. The apparatus defined in claim 40, wherein Service Location Protocol (SLP) is used to exchange information.

* * * * *